UNITED STATES PATENT OFFICE.

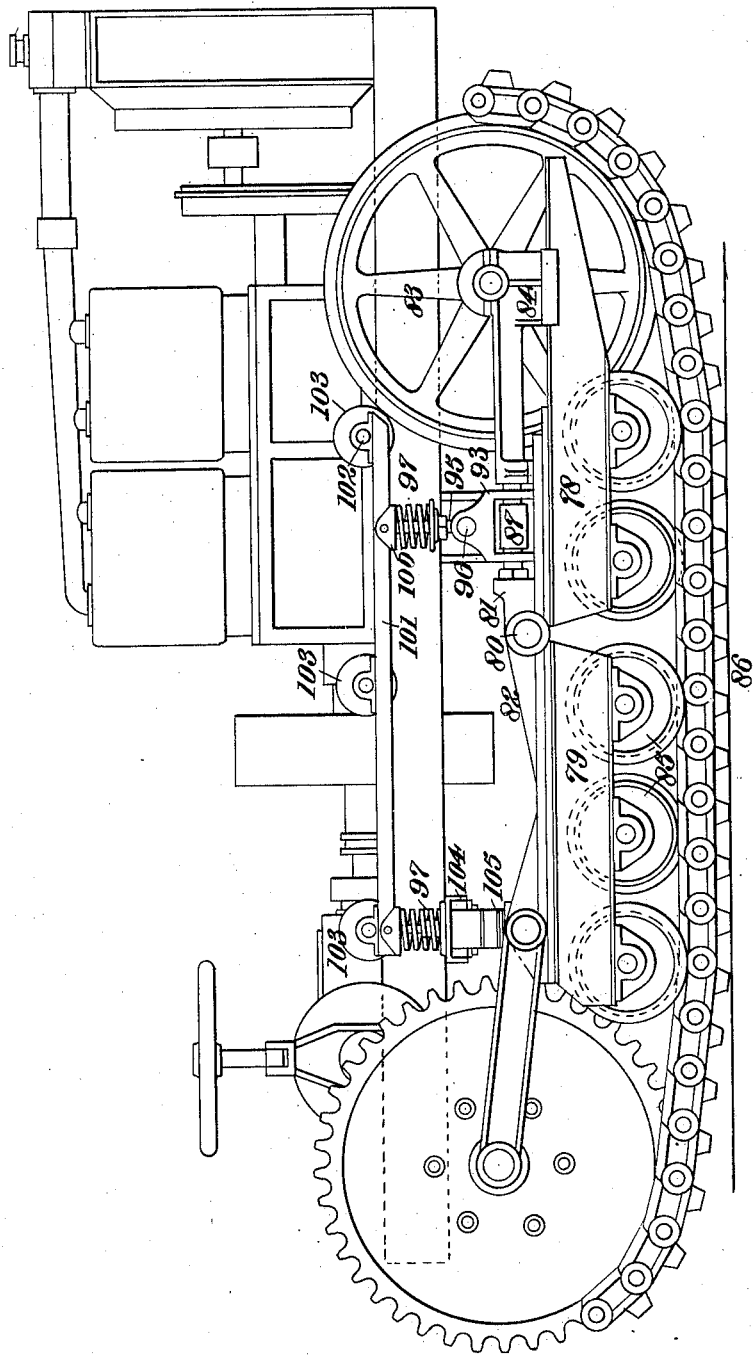

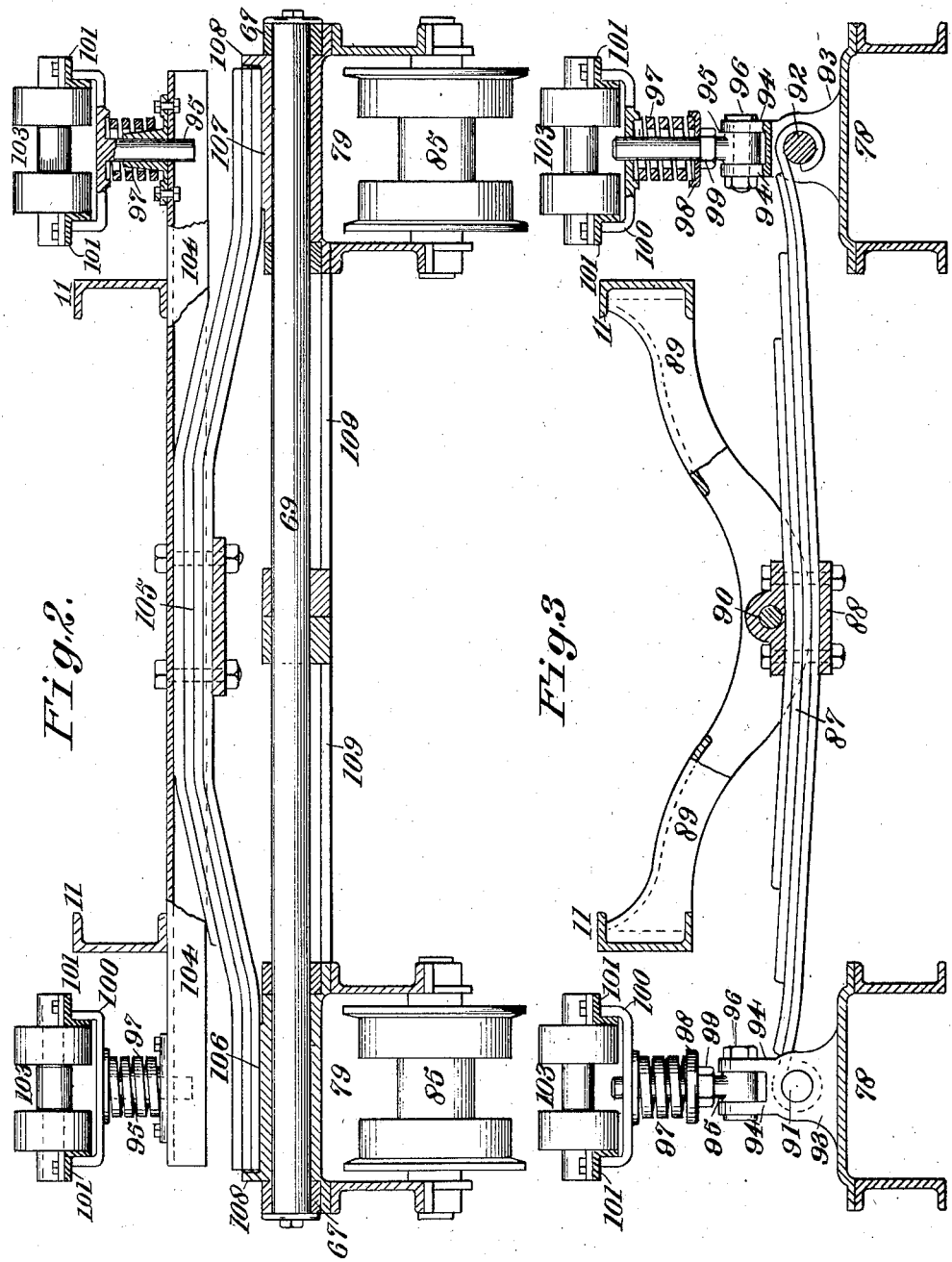

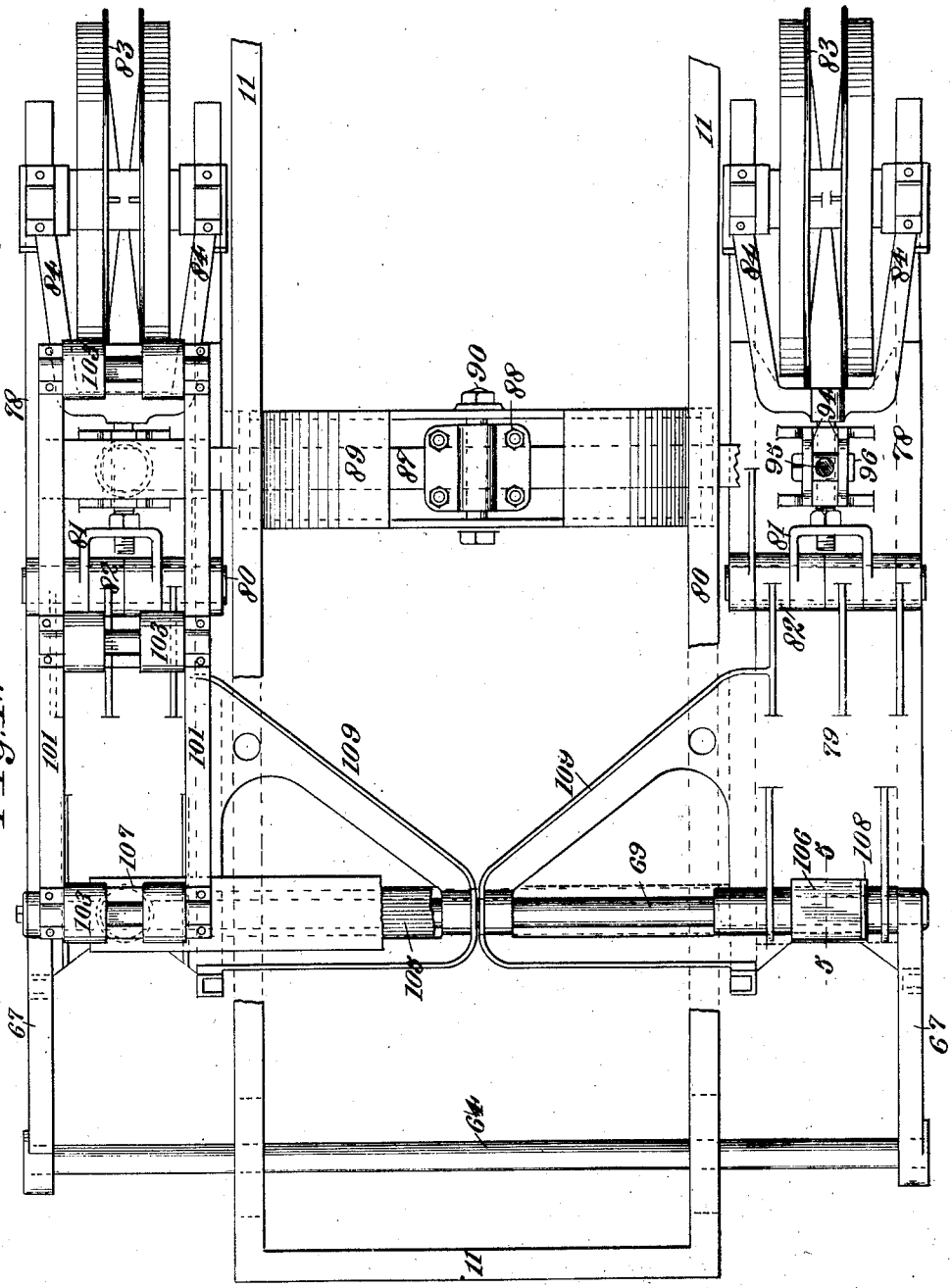

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-LAYING-TRACK TRACTOR.

1,365,431.	Specification of Letters Patent.	Patented Jan. 11, 1921.

Application filed May 7, 1919. Serial No. 295,399.

*To all whom it may concern:*

Be it known that I, ELMER E. WICKERSHAM, a citizen of the United States, residing at Stockton, in the county of San Joaquin and State of California, have invented new and useful Improvements in Self-Laying-Track Tractors, of which the following is a specification.

This invention relates to a self-laying track tractor and particularly pertains to a frame suspension therefor.

It is the principal object of the present invention to provide a tractor having a rigid main frame which is supported upon self-laying track units with a frame suspension, adapted to perform the function of alining the track units at all times, and, at the same time, producing mounting for the frame, whereby it will be completely suspended upon resilient frame members extending transversely of the main frame, thereby giving a very desirable flexibility of movement of the track unit and insuring that the major portion of the shock transmitted to the truck chain will be absorbed in the suspension means rather than to be transmitted to the frame itself.

It is a further object of this invention to provide means disposed in operative relation to the frame suspension means for yieldably supporting the upper run of the chain track, and insuring that the chain will be adequately supported at all times, irrespective of the relative positions of the track unit and the main frame.

The present invention contemplates the use of a rigid truck frame across the rear end of which is disposed a platform spring secured rigidly to a cross-bar on the main frame, and resting with its opposite free ends within seats upon the truck frames, the forward end of the truck frame being yieldably secured to the main frame by means of a centrally pivoted platform spring which is also pivoted to the truck frame at its free end.

Referring to the drawings, it will be seen that the present construction embodies the use of a rigid main frame of any desired formation, upon which is mounted a power plant adapted to drive a transmission mechanism through which separate truck units are driven.

The invention is illustrated by way of example in the accompanying drawings, in which—

Figure 1 is a view in side elevation, illustrating the complete tractor with parts broken away to more clearly disclose its construction.

Fig. 2 is a view in transverse section and elevation, showing the rear suspension means interposed between the main frame and the separate truck frames.

Fig. 3 is a view in transverse section, showing the forward suspension means interposed between the main frame and the truck frames.

Fig. 4 is a fragmentary view in plan, illustrating the truck frames and their connections with the main frame.

Fig. 5 is a view in transverse section on line 5—5 of Fig. 4, showing the spring seat and the pivotal mounting of the truck.

The main frame 11 with its transmission is adapted to be supported upon self-laying track units disposed at opposite sides to this frame and parallel thereto. These units consist of front truck frame sections 78 and rear truck frame sections 79 which are pivotally connected by hinge pins 80 passing through bearings 81 and 82, the bearing 81 being fastened upon the cross-plate of the front truck section near its rear end and the bearing 82 being fastened upon the rear sections of the truck near their forward ends. The two bearings will intermesh, as shown in Fig. 4 and will thus provide a hinged connection which will act to prevent side movement of the separate truck sections in relation to each other. Carried upon the forward end of the section 79 are track idler wheels 83. These wheels are supported by their axles upon adjustable bearings 84. Carried by each of the truck sections is a series of load supporting rollers 85 which are intended to rest upon the lower run of self-laying tracks 86, as shown in Fig. 1. This track embraces the truck sections, the front idler wheels 83 and the sprockets 60, the latter being rotatably mounted upon the rear axle 64. Interposed between the front truck section and the main frame is a leaf spring 87 which is provided with a spring pad 88 properly bolted midway its length and in turn pivotally mounted to a cross-beam 89 by means of a pivot bolt 90. The cross-beam 89 bridges the space between the two side frame members and is shown in Fig. 4. It will be understood that various designs of this beam may be effected, as convenience may dictate. In the present instance the beam is of channel section and accommodates the spring hanger 88 between its side rails. It will be understood that the spring 87 will stand in transverse relation to the main frame and overhang the tops of the forward truck sections 78. The outer ends of the flat spring are formed with eyes adapted to receive spring bolts 91 and 92, which extend longitudinally of the tractor and are carried in proper standards 93. These standards are formed with upstanding parallel lugs 94, between which spring bolts 95 are mounted. These bolts are pivotally held in this position by pivot pins 96. The stems of the spring bolt extend upwardly through coil springs 97 which rest upon spring seats 98 held in position by nuts 99 on the stems. The upper ends of the springs 97 support yokes 100, upon which are carried rails 101. These rails are fitted with bearings 102 for the axles of track supporting rollers 103. The rollers are spaced in relation to each other along their axles and are in direct alinement with the path of travel of the sprocket chain so that the upper sprocket chain run may be supported thereupon. The rear ends of the rails 101 are supported by similar springs 97 carried upon stems 95 and connected to a channel-shaped cross beam 104. This beam is bolted to the underface of the main frame and thereacross.

Rigidly secured between the side flanges of the cross beam 104 is a platform spring 105 which extends outwardly and downwardly and then parallel to the beam 104. These parallel portions form the terminating ends of the spring and are adapted to rest upon seats 106 and 107. The spring seats are formed with a flat surface against which the underfaces of the springs rest and are further provided with an upstanding end flange 108, spaced slightly in relation to the ends of the springs and allowing a limited deflection of the springs, at the same time holding the truck units in alinement. The spring seats are also provided with bearings for the stabilizer shaft 69 which extends transversely of the tractor and in the same plane with the spring 105. The outer ends of the stabilizer shaft 69 are engaged by the thrust rods 67, and thus yieldably tie the rear axle and the stabilizer shaft together for articulate movement. In order to brace the rear truck sections upon which the spring seats 106 are mounted, inwardly extending arms 109 are provided and formed as part of the top casting of these sections. These arms terminate near the longitudinal center of the main frame and are there provided with bearings through which the stabilizer shaft is free to rotate and thus it will be seen that an additional bracing action will be exerted upon the rear truck sections and they will be held against movement toward each other from their parallel positions.

It will thus be seen that due to the use of the present frame suspension means as supporting the frame from yieldable truck units, that the main frame will have a minimum amount of movement when a maximum movement of the truck frame takes place, either in relation to each other or to the main frame and that the vibration and minor vibration imparted to the truck units will be to a great extent, absorbed in the suspension medium, thus making it possible to provide a very easily riding tractor and further making it possible for the separate track units to readily adjust themselves to the contour of the roadway along which they are passing.

Having thus described my invention, what I claim and desire to secure by Letters Patent is—

1. In a vehicle, a main frame, separate self-laying track units at the opposite sides thereof and providing a running gear therefor, a stabilizer shaft pivotally connecting said units adjacent their rear ends, a transverse platform spring fixed to the main frame parallel to the stabilizer shaft and resting with its opposite ends upon the rear ends of the frames of the truck units, and a flexible equalizer bar pivotally connecting the forward ends of the truck units and centrally pivoted to the main frame.

2. In a vehicle, a main frame, a pair of self-laying track units extending along the opposite sides thereof, a stabilizer shaft pivotally connecting the rear ends of said units and holding them in parallelism, a flexible frame suspension member fixed to, and extending transversely of, the main frame and resting with its opposite ends upon the frames of the track units and a centrally pivoted flexible equalizer member pivoted at the front of the main frame and pivotally connected by its outer ends to the forward ends of the frames of the truck units.

3. In a vehicle, a main frame, a self-laying track unit at each side thereof, an equalizer bar connecting opposite truck units together at one end and pivotally supporting the main frame near its center, and a load bearing connection arranged between opposite truck units at the other ends thereof, said connection being in the form of a transversely extending leaf spring, the ends of which rest upon opposite truck units, and the central portion being bowed upwardly and engaging the main frame.

4. In a vehicle, a main frame, a pair of self-laying track units extending along the opposite sides of said main frame, bracket members fixed to the rear of each truck unit and extending inwardly toward each other, a stabilizing shaft passing through the bracket members to pivotally connect the truck units for parallel vertical movement, and a semi-elliptical spring secured to the main frame and resting upon the truck units at its opposite ends.

5. In a vehicle, a main frame, a pair of self-laying track units extending along the opposite sides of said main frame, bracket members fixed to the rear of each truck unit and extending inwardly toward each other, a stabilizing shaft passing through the bracket members to pivotally connect the truck units for parallel vertical movement, a semi-elliptical spring secured to, and transversely of, the main frame and in vertical alinement with said stabilizing shaft and seats formed upon the tops of the shaft brackets for receiving the opposite ends of the spring.

6. In a vehicle, a main frame, a pair of self-laying track units extending along the opposite sides of said main frame, bracket members fixed to the rear of each truck unit and extending inwardly toward each other, a stabilizing shaft passing through the bracket members to pivotally connect the truck units for parallel vertical movement, a semi-elliptical spring secured to, and transversely of, the main frame and in vertical alinement with said stabilizing shaft, seats formed upon the tops of the shaft brackets for receiving the opposite ends of the spring, and means for limiting the lateral movement of the truck frames in relation to said spring.

7. In a vehicle, a main frame, a pair of self-laying track units extending along the opposite sides of said main frame, bracket members fixed to the rear of each truck unit and extending inwardly toward each other, a stabilizing shaft passing through the bracket members to pivotally connect the truck units for parallel vertical movement, a semi-elliptical spring secured to, and transversely of, the main frame and in vertical alinement with said stabilizing shaft, seats formed upon the tops of the shaft brackets for receiving the opposite ends of the spring, means for limiting the lateral movement of the truck frames in relation to said spring, and yieldable equalizing means connecting the forward ends of the truck frames and the main frame.

In testimony whereof I have hereunto set my hand in the presence of two subscribing witnesses.

ELMER E. WICKERSHAM.

Witnesses:
EDWARD E. BREITENBUCHER,
DAVID B. LYMAN.